L. J. CORBITT.
INDICATOR LOCK.
APPLICATION FILED AUG. 9, 1920.
1,421,411.
Patented July 4, 1922.
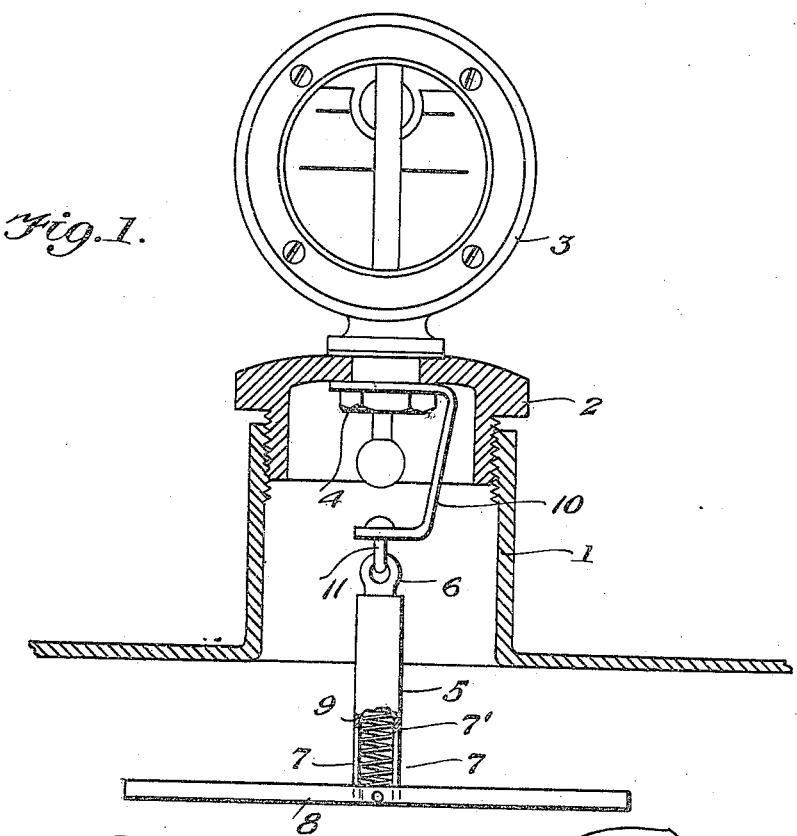
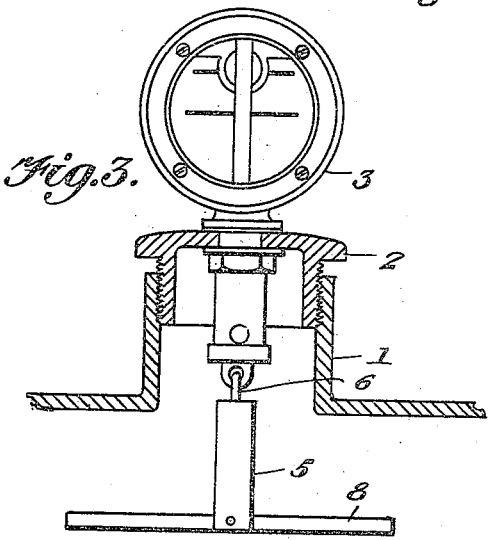
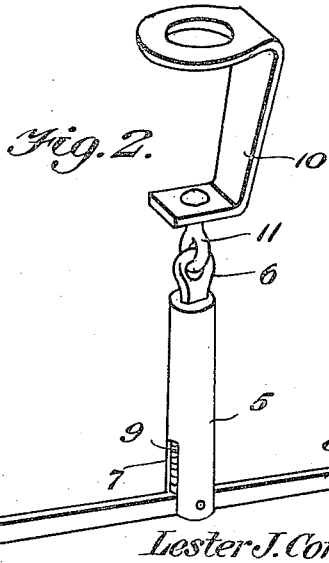
Lester J. Corbitt
INVENTOR
BY Victor J. Evans
ATTORNEY

UNITED STATES PATENT OFFICE.

LESTER J. CORBITT, OF DETROIT, MICHIGAN.

INDICATOR LOCK.

1,421,411. Specification of Letters Patent. Patented July 4, 1922.

Application filed August 9, 1920. Serial No. 402,097.

*To all whom it may concern:*

Be it known that I, LESTER J. CORBITT, a citizen of the United States, residing at Detroit, in the county of Wayne and State of Michigan, have invented new and useful Improvements in Indicator Locks, of which the following is a specification.

This invention relates to means for preventing theft of motor meters from the radiators of automobiles and the like, the principal object of the invention being to permanently attach the radiator cap with the motor meter thereon to the radiator so as to prevent the cap and motor meter from being stolen while permitting the radiator cap to be removed sufficiently to refill the radiator.

Another object of the invention is to make the locking means in the form of a stem which is adapted to be attached to the radiator cap and which carries a cross bar which is adapted to engage the inner part of the top of the radiator to prevent withdrawal of the stem from the filling spout and which is held at right angles to the stem by a spring, the stem being slotted to permit the tilting of the cross bar to place the device through the filling spout.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a sectional view through the filling spout of a radiator showing my invention in use.

Figure 2 is an enlarged view of the device itself.

Figure 3 is a view of the device used on a new model motor meter.

Referring to Figures 1 and 2, 1 indicates the filling spout of the radiator, 2 the cap thereof and 3 the motor meter carried by the cap and secured thereto by the nut 4 engaging a screw threaded part of the motor meter which passes through the cap.

My locking means consists of a stem 5 which has an eye bolt 6 at its top end and a bore 7' and slots 7 at its lower end. A cross bar 8 is pivoted at said slotted end and a spring 9 is located in said bore and this spring acts to hold the rod at right angles to the stem. The stem is connected with the cap by means of the link 10 which has its upper end bent at right angles and provided with an opening to receive the threaded part of the motor meter so that it is held to the bottom of the cap by the nut 4. The lower end of the link is provided with an eye bolt 11 for engaging the eye bolt 6.

In the new type of motor meter the link 10 is not necessary as the stem is connected directly with the motor meter, or to the guard thereof.

After connecting the stem with the cap the cross rod 8 is tilted so that the rod and stem can be passed through the filling spout. As soon as the upper end of the tilted rod passes below the bottom of the spout the spring will force the rod into position at right angles with the stem so that when the stem is pulled upwardly said rod will engage the bottom of the spout on the top of the radiator and prevent further movement of the parts. The parts are so formed that the cap can be removed from the filling spout so that the radiator can be refilled but it cannot be entirely detached from the radiator. The nut 4 being arranged within the cap 2 cannot be unscrewed without difficulty. The device is short enough as to prevent the entrance of a hook through the filling spout in an attempt to lift one end of the cross bar as the device must be lowered to permit the cross bar to turn and when this is done there is no room between the cap and the filling spout for the tool or hook. The eye bolts form a swivel so that the cap can be screwed and unscrewed without interference on the part of the locking device.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

The combination with a radiator and its cap and an attachment carried by the cap, of means for permanently connecting the cap with the radiator while permitting its partial removal therefrom for filling purposes, such means consisting of a stem swiveled to a part on the cap, said stem having a bore in its lower end and a pair of diametrically arranged slots communicating with the bore, a cross rod passing through the slots and pivoted to the lower end of the stem and a spring in the bore engaging the rod for holding the same at right angles to the stem.

In testimony whereof I affix my signature.

LESTER J. CORBITT.